United States Patent
Sun et al.

(10) Patent No.: US 8,335,082 B2
(45) Date of Patent: Dec. 18, 2012

(54) HEAT DISSIPATING APPARATUS

(75) Inventors: Hong-Zhi Sun, Shenzhen (CN); Chen Chen, Shenzhen (CN); Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 103 days.

(21) Appl. No.: 13/095,863

(22) Filed: Apr. 28, 2011

(65) Prior Publication Data

US 2012/0067553 A1   Mar. 22, 2012

(30) Foreign Application Priority Data

Sep. 21, 2010  (CN) .......................... 2010 1 0288810

(51) Int. Cl.
*H05K 7/20* (2006.01)

(52) U.S. Cl. ................... 361/695; 361/679.49; 361/694; 361/700

(58) Field of Classification Search ............ 361/679.47–679.52, 694, 695, 700; 454/184
See application file for complete search history.

(56) References Cited

U.S. PATENT DOCUMENTS

| | | | |
|---|---|---|---|
| 6,400,568 B1 * | 6/2002 | Kim et al. ..................... 361/697 |
| 6,938,682 B2 * | 9/2005 | Chen et al. ............... 165/104.33 |
| 6,989,988 B2 * | 1/2006 | Arbogast et al. ............. 361/695 |
| 7,215,548 B1 * | 5/2007 | Wu et al. ....................... 361/703 |
| 7,256,997 B2 * | 8/2007 | Chen et al. ................... 361/697 |
| 7,401,642 B2 * | 7/2008 | Lo ................................ 165/80.3 |
| 7,933,119 B2 * | 4/2011 | Wiltzius et al. .......... 361/679.47 |
| 2006/0181846 A1 * | 8/2006 | Farnsworth et al. ......... 361/695 |
| 2007/0091566 A1 * | 4/2007 | Sun .............................. 361/695 |
| 2008/0101018 A1 * | 5/2008 | Long et al. .................... 361/695 |
| 2008/0151498 A1 * | 6/2008 | Zhang ........................... 361/697 |

* cited by examiner

*Primary Examiner* — Gregory Thompson
(74) *Attorney, Agent, or Firm* — Altis Law Group, Inc.

(57) ABSTRACT

A heat dissipating apparatus comprises a cooler, an air duct, and a cooling fan. a cooler secured to a circuit board of a host; the cooler is secured to a circuit board of a host; the air duct, covers the cooler, comprises a side tray that is substantially perpendicular to the circuit board; the cooling fan is secured to the cooler and located on a side of the cooler, and adjacent to the side tray; a gap is defined between the side tray and the cooler, an air guiding board is located in the gap and extends towards a VRM that is secured to the circuit board, and the air guiding board is configured to direct air flowing towards the VRM.

20 Claims, 5 Drawing Sheets

HEAT DISSIPATING APPARATUS

REARGROUND

1. Technical Field

The present disclosure relates to heat dissipating apparatuses, and particularly to a heat dissipating apparatus in a case.

2. Description of Related Art

At present, the computer is developing towards miniaturization. A system fan is concealed in many small hosts, but the temperature of the Voltage Regulator Module (VRM) adjacent to the Central Processing Unit (CPU) is high, because the air flow is decreased when concealing the system fan. The VRM is adjacent to the air inlets of a power supplier in the host, so the temperature of the air into the air inlets is high and affects the cooling power.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
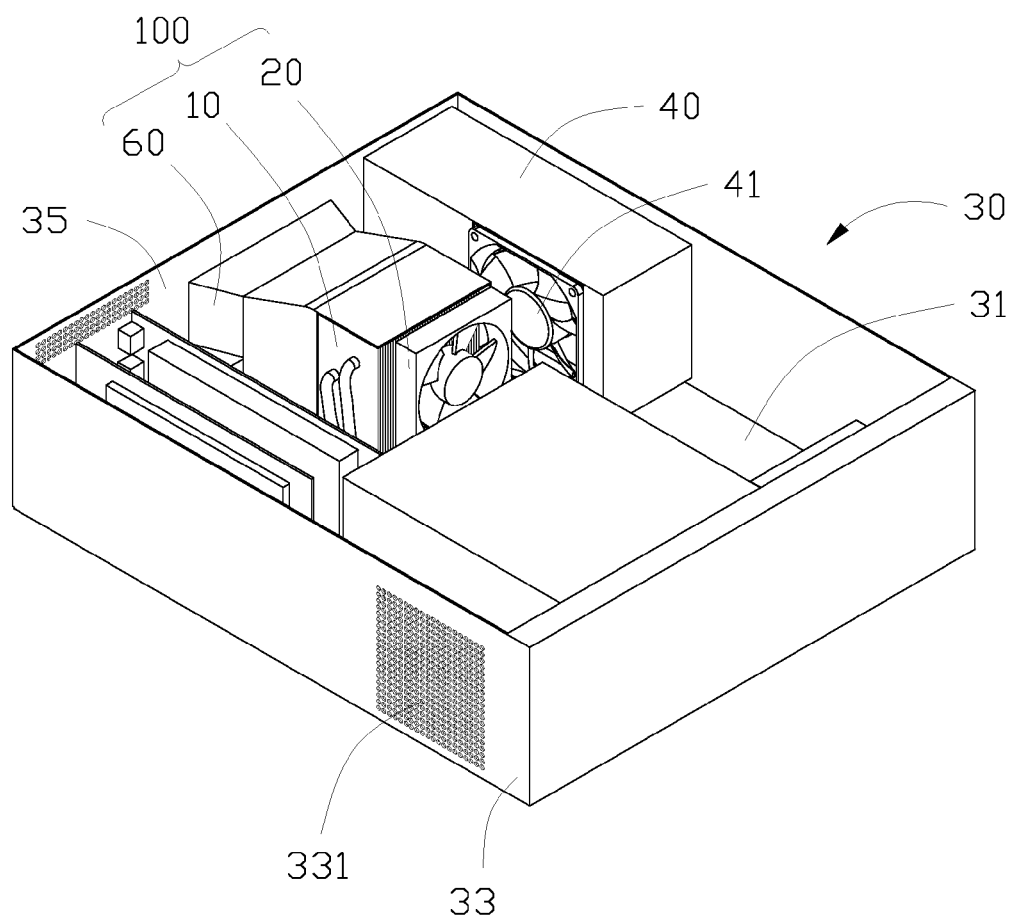
FIG. 1 is an assembled, isometric view of a heat dissipating apparatus and a host in accordance with one embodiment.
Figure 2:
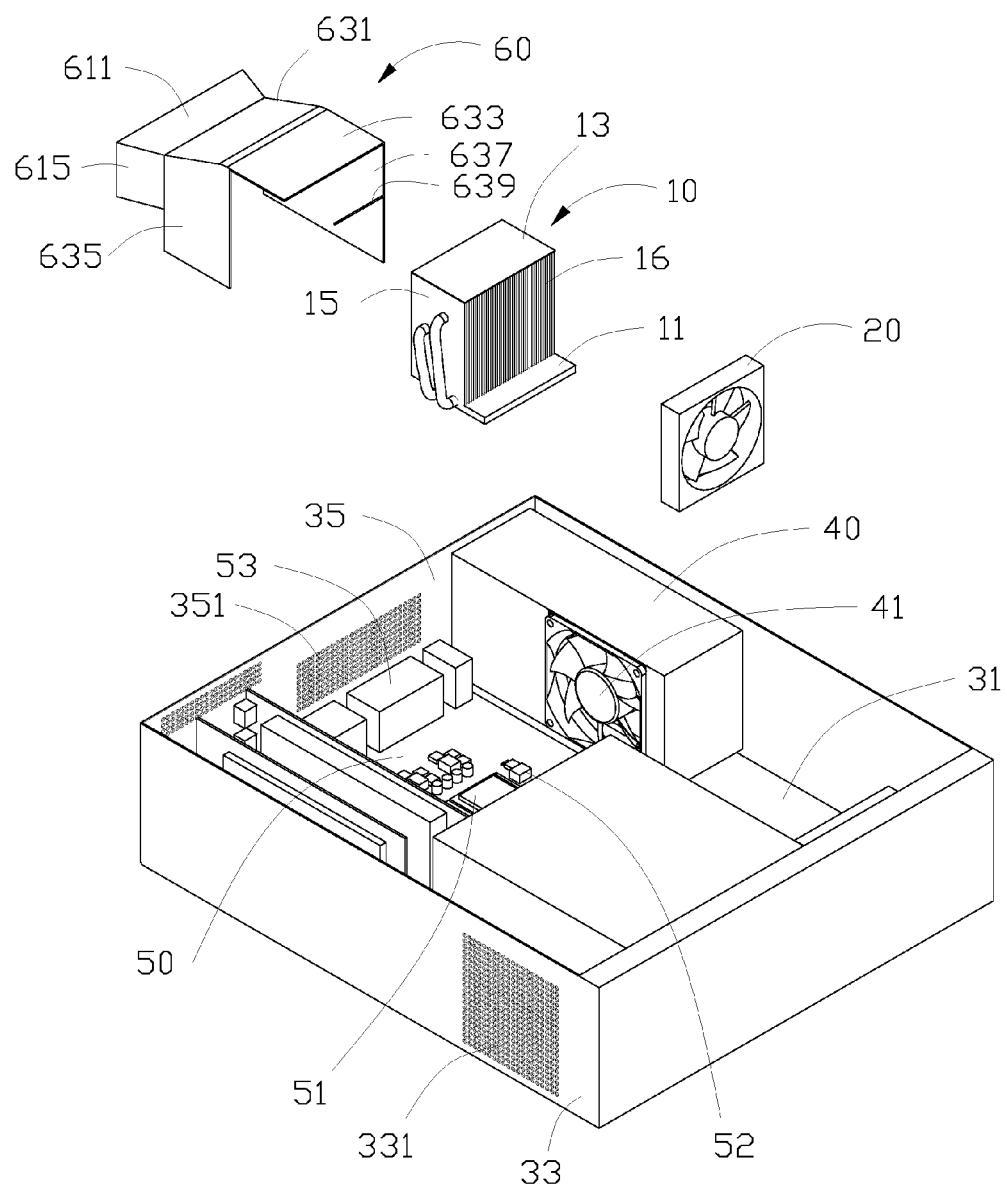
FIG. 2 is an exploded, isometric view of the heat dissipating apparatus and a host in accordance with one embodiment.

Referring to FIG. 1 and FIG. 2, according to an embodiment, a heat dissipating apparatus 100 is capable of being secured to a host 30 and includes a cooler 10, a cooling fan 20 and an air duct 60.

The host 30 includes a bottom plate 31, a side plate 33, a rear plate 35, a power supply 40 and a circuit board 50. In an embodiment, the bottom plate 31 is substantially perpendicular to the side plate 33 and the rear plate 35. The side plate 33 is substantially perpendicular to the rear plate 35. The side plate 33 defines a plurality of air inlets 331, and the rear plate 35 defines a plurality of air outlets 351. The circuit board 50 is located on the bottom plate 31. A CPU 51, a VRM 52, and a plurality of connectors 53 are located on the circuit board 50. In an embodiment, the circuit board 50 may be a computer motherboard. A power supply fan 41 is located in the power supply 40. The VRM 52 is located between the power supply fan 41 and the CPU 51. The VRM 52 is adjacent to the CPU 51, and the connectors 53 are adjacent to the rear plate 35 below the air outlets 351.

The cooler 10 includes a bottom wall 11, a top wall 13, a first sidewall 15 and a second wall (not shown). In one embodiment, the bottom wall 11 is substantially parallel to the top wall 13 and perpendicular to the first sidewall 15. A plurality of fins 16 is located among the bottom wall 11, the top wall 13, the first sidewall 15, and the second sidewall. The fins 16 are substantially perpendicular to the bottom wall 11. A channel is defined between each two adjacent fins 16.

Figure 3:
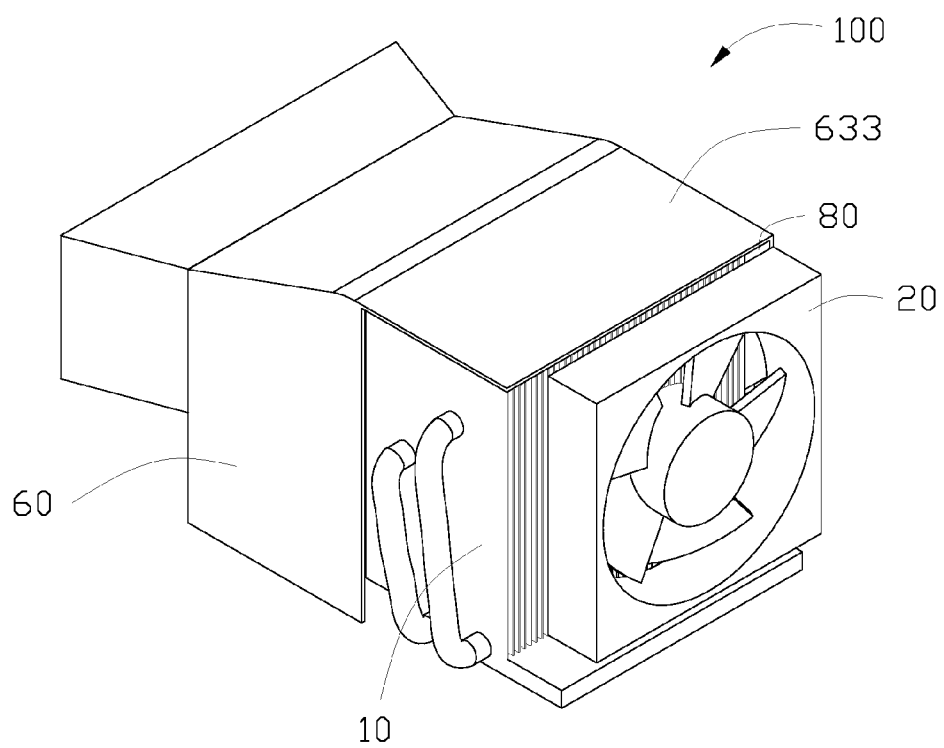
FIG. 3 is an assembled, isometric view of the heat dissipating apparatus.
Figure 4:
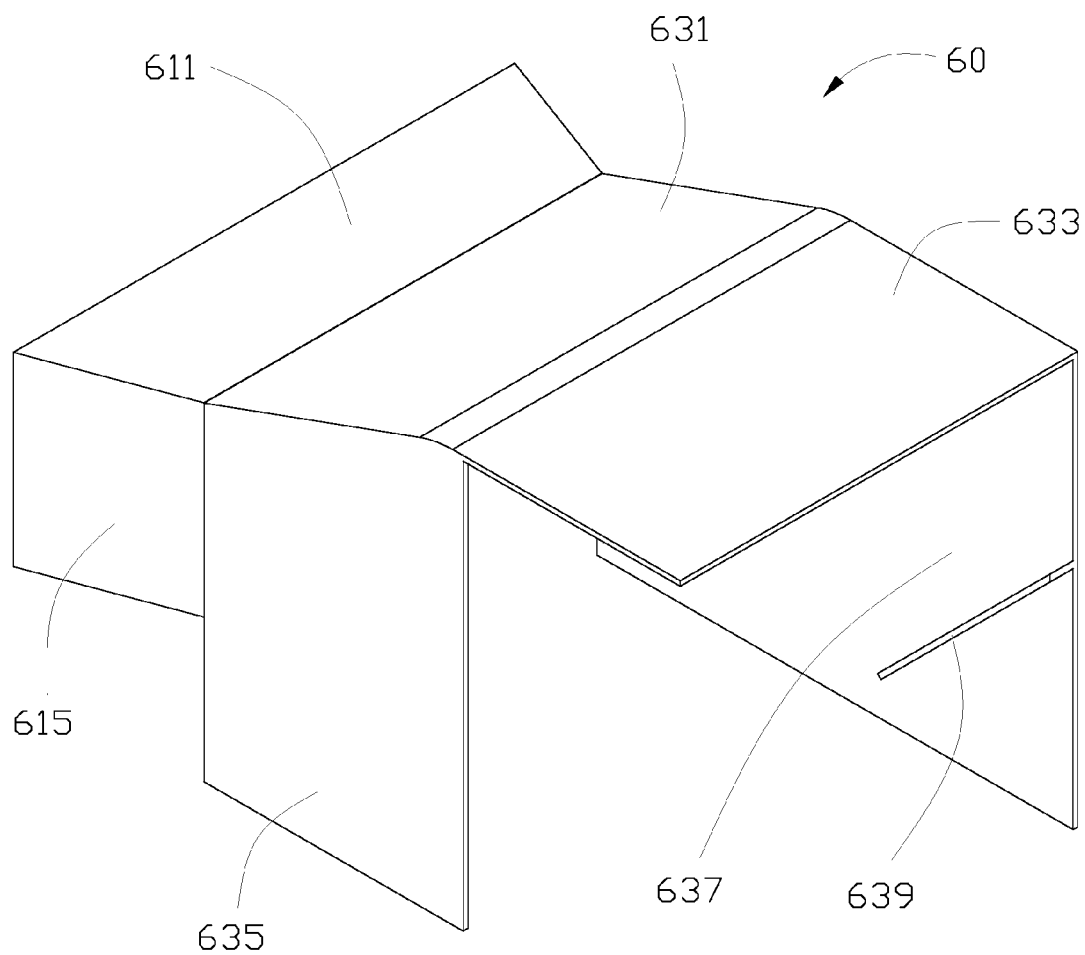
FIG. 4 is an isometric view of an air duct of the heat dissipating apparatus.
Figure 5:
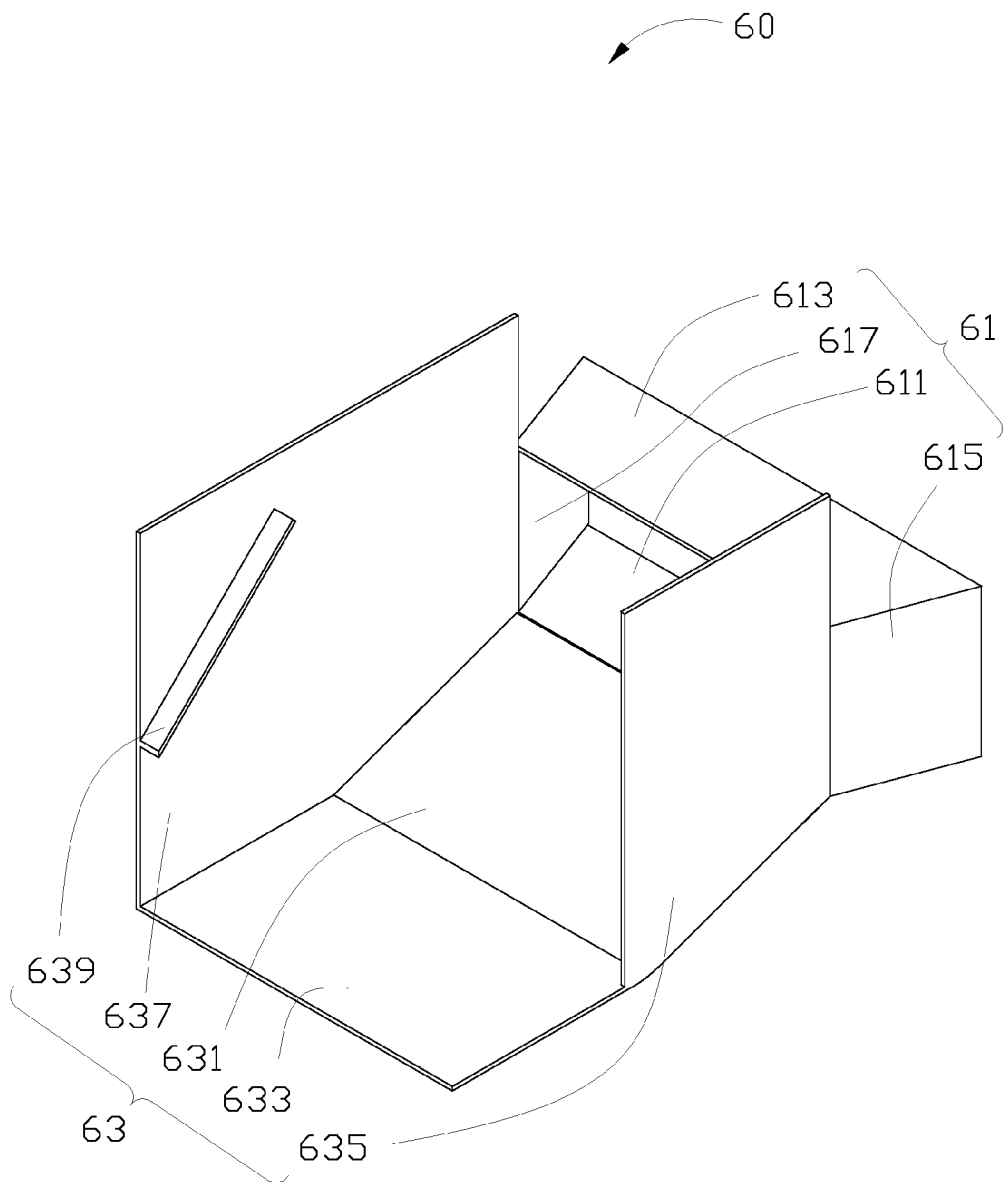
FIG. 5 is similar to FIG. 4, but viewed from another aspect.

Referring to FIG. 3 to FIG. 5, the air duct 60 includes a first body 61 and a second body 63 located on the first body 61. The first body 61 includes a first top tray 611, a first bottom tray 613, a first side tray 615 and a second side tray 617. The first top tray 611 is substantially parallel to the first bottom tray 613. In one embodiment, the first top tray 611 and the first bottom tray 613 are trapezium. The second body 63 includes a second top tray 631, a third top tray 633, a third side tray 635 and a fourth side tray 637. An angle is defined between the second top tray 631 and the third top tray 633. In one embodiment, the angle is obtuse. The third side tray 635 extends from a side edge of the second top tray 631 and is connected to the first side tray 615. The fourth side tray 637 is opposite to the third side tray 635 and is connected to the second side tray 617, the second top tray 631 and the third top tray 633. An air guiding board 639 is located on the fourth side tray 637 perpendicular to the fourth side tray 637. The air guiding board 639 extends aslant from a side edge of the fourth side tray 637. A distance between the air guiding board 639 and the fourth side tray 637 is approximately equal to that between the fourth side tray 637 and the cooler 10.

In assembly of the heat dissipating apparatus 100, the cooler 10 is located among the third top tray 633, the fourth side tray 637 and the third side tray 635. The third top tray 633 is located above the top wall 13 of the cooler 10. The third side tray 635 abuts an edge of the first sidewall 15. A gap 80 is defined between the fourth side tray 637 and the second sidewall of the cooler 10 (referring to FIG. 3). The width of the gap 80 is approximately equal to that of the fourth side tray 637. The cooling fan 20 is secured to the bottom wall 11 and adjacent to the fourth side tray 637. The cooler 10 abuts the CPU 51. The second body 63 covers the cooler 10 and the VRM 52, and the VRM 52 is located between the fourth side tray 637 and the second sidewall. An angle is defined between the air guiding board 639 and the circuit board. In one embodiment, the angle is acute. The first body 61 is opposite to the air outlets 351, and the lower surface of the first bottom tray 613 abuts the connectors 53.

When the heat dissipating apparatus 100 works, air flows into the host 30 via the air inlets 331 and flows through the heat dissipating apparatus 100 via the cooling fan 20. The air flowed into the cooling fan 20 discharges the heat caused by the CPU 51 out off the host 30 via the channel formed by the fins 16, the second body 63, the first body 61 and the outlets 351. Air flows into the gap 80 and the VRM 52 by being guided from the air guiding board 639. The VRM 52 is cooled.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:
1. A heat dissipating apparatus comprising:
a cooler secured to a component on a circuit board of a host;
an air duct, covering the cooler, comprising a side tray substantially perpendicular to the circuit board;

a cooling fan secured to the cooler and located on a side of the cooler and adjacent to the side tray;

wherein an air guiding board is secured to the side tray and located between the side tray and the cooler; the air guiding board defines an air-flowing direction towards the circuit board when the air flows below the air guiding board and between the cooler and the air duct.

2. The heat dissipating apparatus of claim 1, wherein the air guiding board extends obliquely from the side tray.

3. The heat dissipating apparatus of claim 1, wherein the air guiding board is substantially perpendicular to the side tray.

4. The heat dissipating apparatus of claim 1, wherein an angle is defined between the air guiding board and the circuit board, and the angle is acute.

5. The heat dissipating apparatus of claim 1, wherein a distance between the air guiding board and the side tray is approximately equal to that between the side tray and the cooler.

6. The heat dissipating apparatus of claim 1, wherein the air duct comprises a first body and a second body connected to the first body.

7. The heat dissipating apparatus of claim 6, wherein the first body extends towards an air outlet defined in the host.

8. The heat dissipating apparatus of claim 6, wherein the first body comprises a first top tray, the second body comprises a second top tray and a third top tray, and the second top tray is connected to the first top tray and the third top tray.

9. The heat dissipating apparatus of claim 8, wherein the third top tray covers the cooler.

10. The heat dissipating apparatus of claim 8, wherein an angle is defined between the second top tray and the third top tray, and the angle is obtuse.

11. A heat dissipating apparatus comprising:
a cooler secured to a component on a circuit board of a host;
an air duct, covering the cooler, comprising a side tray that is substantially perpendicular to the circuit board;
a cooling fan, secured to the cooler, located on a side of the cooler and adjacent to the side tray;
wherein a gap is defined between the side tray and the cooler, an air guiding board is located in the gap and extends towards a VRM that is secured to the circuit board, and the air guiding board is configured to direct air flowing towards the VRM.

12. The heat dissipating apparatus of claim 11, wherein the air guiding board extends obliquely from the side tray.

13. The heat dissipating apparatus of claim 11, wherein the air guiding board is substantially perpendicular to the side tray.

14. The heat dissipating apparatus of claim 11, wherein an angle is defined between the air guiding board and the circuit board, and the angle is acute.

15. The heat dissipating apparatus of claim 11, wherein a distance between the air guiding board and the side tray is approximately equal to that between the side tray and the cooler.

16. The heat dissipating apparatus of claim 11, wherein the air duct comprises a first body and a second body connected to the first body.

17. The heat dissipating apparatus of claim 16, wherein the first body extends towards an air outlet defined in the host.

18. The heat dissipating apparatus of claim 16, wherein the first body comprises a first top tray, the second body comprises a second top tray and a third top tray, and the second top tray is connected to the first top tray and the third top tray.

19. The heat dissipating apparatus of claim 18, wherein the third top tray covers the cooler.

20. The heat dissipating apparatus of claim 18, wherein an angle is defined between the third top tray and the second top tray, and the angle is obtuse.

* * * * *